(No Model.)
B. F. FLINT.
REVOLVING ELECTRIC LIGHT.
No. 505,098. Patented Sept. 19, 1893.
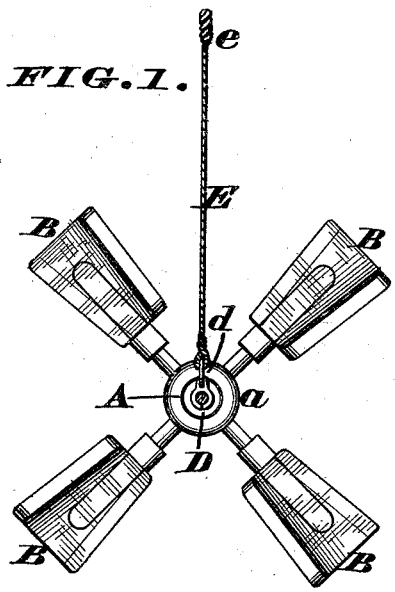
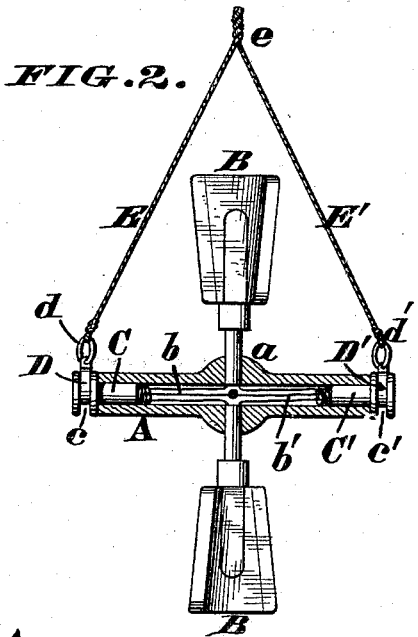
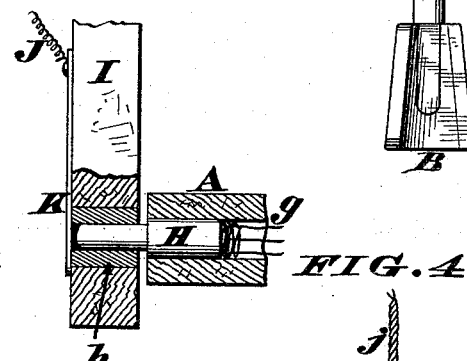
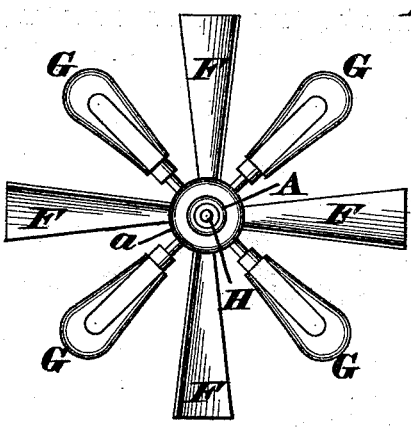
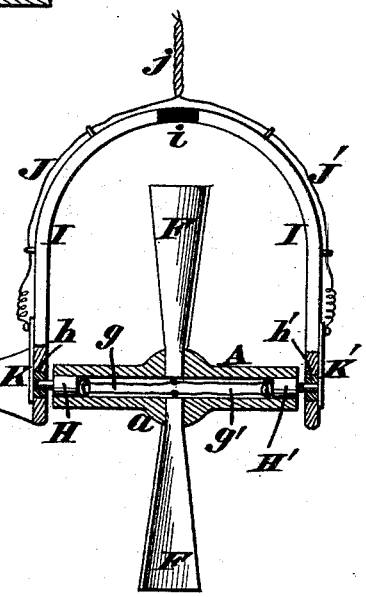
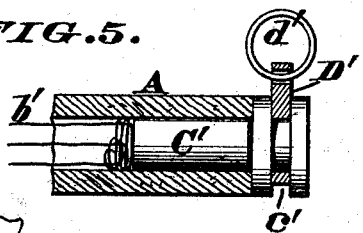
Attest.
Arthur Moore
John W. Layman
Inventor.
Benjamin F. Flint.
By James H. Layman
Atty.

UNITED STATES PATENT OFFICE.

BENJAMIN F. FLINT, OF CINCINNATI, OHIO.

REVOLVING ELECTRIC LIGHT.

SPECIFICATION forming part of Letters Patent No. 505,098, dated September 19, 1893.

Application filed July 5, 1893. Serial No. 479,666. (No model.)

*To all whom it may concern:*

Be it known that I, BENJAMIN F. FLINT, a citizen of the United States, residing at Cincinnati, in the county of Hamilton and State of Ohio, have invented certain new and useful Improvements in Revolving Electric Lights; and I do hereby declare the following to be a full, clear, and exact description of the invention, reference being had to the annexed drawings, which form part of this specification.

My invention comprises a revolving electric-light, which can be turned by a current of air in the same manner as an ordinary windmill. In some cases, this result may be effected by arming the shafts of the apparatus with a series of glass globes of substantially the same shape as windmill sails, in order that the action of air directly against these globes may revolve said shaft at a very high speed. But in other cases, the shaft may be armed with ordinary glass globes and customary sails, against which latter the wind exerts its force, as hereinafter more fully described.

In the annexed drawings, Figure 1 is a front elevation of the simple form of my invention. Fig. 2 is a sectionized side-elevation of the same. Fig. 3 is a front elevation of the shaft, sails and globes of the complex form of my invention. Fig. 4 is a side elevation, showing said devices applied to a supporting frame or yoke, the shaft being sectioned. Figs. 5 and 6 are detail views.

The main shaft A, of the apparatus is usually of wood, with a central swell or bulb $a$, and is hollow, to admit wires that conduct the electric currents to the lamps, which latter may be constructed and arranged, as seen in Figs. 1 and 2. In these illustrations, the lamps, of which any desired number may be used, radiate from the shaft, and the globes B of said lamps are so shaped as to resemble windmill sails or blades, being set at any angle capable of producing the best results.

C, C′, represent metallic plugs securely inserted in the ends of the tubular shaft A, and each plug is provided with an annular groove $c$, $c'$, to admit split rings D, D′, having links $d$, $d'$, to which latter are attached wires E, E′, united together at $e$. These wires perform the twofold duty of supporting the shaft and conducting the electric currents to the plugs C, C′, and as the wires $b$, $b'$, that connect with the lamps are in contact with the inner ends of said plugs, it is evident an illumination is obtained without exposing the cause thereof.

The contact of wires $b'$ is effected by twisting or bunching the ends together and causing them to bear directly against the plug C′, as represented in Fig. 5. The other wires $b$ are arranged in a precisely similar manner, with reference to plug C.

The device, as above constructed, is designed more especially for use in store windows and should be so arranged as to diffuse the lights very thoroughly, the desired rotary motion being effected by causing a blast of air to strike against the face of the sail-shaped shades B. This blast may be produced by a fan or blower of any kind, and the nozzle or ventage through which the current is discharged should be concealed by some object in the show window.

The elaborate form of my invention, seen in Figs. 3 and 4 is intended for out-door use, and to be turned by the wind, independently of a special blast, for which purpose the shaft A, is armed with regular windmill sails or blades F, and carries obliquely disposed globes G, similar to the globes B, previously described. These globes are located between the sails, and have wires $g$, $g'$, communicating with metallic journals H, H′, inserted in the ends of shaft A, the journals being fitted in metallic bushings $h$, $h'$, secured near the lower extremities of a bow-shaped frame or yoke I. This yoke is usually made of wood, or other suitable non-conducting material, and is supported by a pair of wires J, J′, united together at $j$ and communicating with some source of electric supply. The lower ends of these wires connect with plates K, K′, secured to yoke I, and serving to make contact with the bushings $h$, $h'$, and thence with the journals H, H′.

L is a vane, attached to yoke I for the purpose of keeping the device in a proper position to be turned by the wind. In using this form of the invention, the united portion $j$ of the electric wires, is attached to a suitable support in the street, in order that the apparatus may turn freely in every direction, so as to cause the sails F, to be presented to the wind. Consequently, the device is revolved at a high speed, on the same principle as a windmill, the electric lights producing very brilliant rings or zones, the attractiveness of which may be increased by making the globes of different colors.

In another modification, the shaft A may be made of metal, in which case but one plug C or C' would be used, and it should be completely insulated, and one current can then be led directly into said metallic shaft. Finally, the yoke I may also be metallic, in which event it should be divided into two parts by a non-conducting section, as indicated by the black portion *i*.

I claim as my invention—

1. The combination, in an illuminating-device, of a revolving-shaft carrying electric-lights, wires that conduct the currents to said lights, and obliquely-arranged blades, which latter turn said shaft, when struck by a current of air, substantially as herein described.

2. An illuminating device consisting of a shaft armed with a series of globes, and wires that conduct electric currents into the latter, said globes being of such a shape and so arranged as to be struck by the wind and thereby revolve said shaft, substantially as herein described.

3. The combination, in a revolving electric light, of shaft A, provided with sails F, obliquely disposed globes G, and wires *g*, *g'*, journals H, H' inserted in the ends of said shaft and communicating with said wires *g*, *g'*, a yoke I, suspended from wires J, J', united together at *j*, bushings *h*, *h'*, secured in said yoke and serving as bearings for said journals H, H' and means for causing the electric currents to pass from the suspension wires, J, J', into said bushings *h*, *h'*, all as herein described.

In testimony whereof I affix my signature in presence of two witnesses.

BENJAMIN F. FLINT.

Witnesses:
JAMES H. LAYMAN,
ARTHUR MOORE.